United States Patent
Wang et al.

(10) Patent No.: US 12,096,246 B2
(45) Date of Patent: Sep. 17, 2024

(54) OPTIMIZING A CELLULAR NETWORK USING MACHINE LEARNING

(71) Applicant: Google LLC, Mountain View, CA (US)

(72) Inventors: Jibing Wang, San Jose, CA (US); Erik Richard Stauffer, Sunnyvale, CA (US)

(73) Assignee: Google LLC, Mountain View, CA (US)

( * ) Notice: Subject to any disclaimer, the term of this patent is extended or adjusted under 35 U.S.C. 154(b) by 381 days.

(21) Appl. No.: 17/619,088

(22) PCT Filed: Jun. 22, 2020

(86) PCT No.: PCT/US2020/038921
§ 371 (c)(1),
(2) Date: Dec. 14, 2021

(87) PCT Pub. No.: WO2021/007019
PCT Pub. Date: Jan. 14, 2021

(65) Prior Publication Data
US 2022/0322107 A1  Oct. 6, 2022

Related U.S. Application Data

(60) Provisional application No. 62/871,509, filed on Jul. 8, 2019.

(51) Int. Cl.
*H04W 24/02* (2009.01)
*G06N 3/08* (2023.01)
*H04W 24/10* (2009.01)

(52) U.S. Cl.
CPC ............ *H04W 24/02* (2013.01); *G06N 3/08* (2013.01); *H04W 24/10* (2013.01)

(58) Field of Classification Search
CPC ........ H04W 24/02; H04W 24/10; G06N 3/08; G06N 3/044; G06N 3/045; G06N 20/00
See application file for complete search history.

(56) References Cited

U.S. PATENT DOCUMENTS

| | | |
|---|---|---|
| 9,661,441 B2 | 5/2017 | Da Silva et al. |
| 10,004,011 B2 | 6/2018 | Lieshout et al. |
| (Continued) | | |

FOREIGN PATENT DOCUMENTS

| | | |
|---|---|---|
| EP | 2934037 | 10/2015 |
| WO | 2018162069 | 9/2018 |
| WO | 2021007019 | 1/2021 |

OTHER PUBLICATIONS

"International Preliminary Report on Patentability", Application No. PCT/US2020/038921, Jun. 10, 2021, 7 pages.

(Continued)

*Primary Examiner* — Shailendra Kumar
(74) *Attorney, Agent, or Firm* — Womble Bond Dickinson (US) LLP

(57) ABSTRACT

This document describes techniques and apparatuses for optimizing a cellular network using machine learning. In particular, a network-optimization controller uses machine learning to determine an optimized network-configuration parameter that affects a performance metric of the cellular network. To make this determination, the network-optimization controller requests and analyzes gradients determined by one or more user equipments, one or more base stations, or combinations thereof. By using machine learning, the network-optimization controller identifies different optimized network-configuration parameters associated with different local optima or global optima of an optimization function, and selects a particular optimized network-configuration parameter that is appropriate for a given environment. In this manner, the network-optimization controller dynamically optimizes the cellular network to account for both short-term and long-term environmental changes.

20 Claims, 7 Drawing Sheets

(56) References Cited

U.S. PATENT DOCUMENTS

| | | | |
|---|---|---|---|
| 2012/0276893 A1 | 11/2012 | Lerbour et al. | |
| 2013/0109421 A1* | 5/2013 | Guey | H04W 24/02 |
| | | | 455/507 |
| 2015/0289149 A1* | 10/2015 | Ouyang | H04W 16/18 |
| | | | 370/252 |
| 2019/0014487 A1* | 1/2019 | Yang | G06N 3/084 |
| 2019/0132708 A1 | 5/2019 | Beighoul et al. | |

OTHER PUBLICATIONS

"International Search Report and Written Opinion", Application No. PCT/US2020/038921, Sep. 15, 2020, 14 pages.
Guo, et al., "Cellular Network Configuration via Online Learning and Joint Optimization", Computer Science Department, University of California, Davis, USA, Dec. 2017, Dec. 2017, 6 pages.
European Search Report in related EP application No. 24157003.5 dated Feb. 28, 2024, pp. 1-10.

* cited by examiner

OPTIMIZING A CELLULAR NETWORK USING MACHINE LEARNING

RELATED APPLICATION(S)

This application is a national stage entry of International Application No. PCT/US2020/038921, filed Jun. 22, 2020, which in turn claims priority to U.S. Provisional Application 62/871,509, filed Jul. 8, 2019, the disclosures of which are incorporated herein by reference in their entireties.

A wireless network provider performs cell planning to design a cellular network. Through cell planning, the network provider determines a quantity of base stations to deploy, locations of these base stations, and configurations of these base stations to achieve a particular coverage area, quality of service, or operational cost. To make these determinations, the cell planning process analyzes a geographic area to determine expected traffic and simulates signal propagation characteristics based on the terrain and clutter in the geographic area.

The analysis and simulation used by cell planning, however, may assume a static nominal environment (e.g., a particular population density, a particular topography, a particular clutter or land use classification, or a particular type of weather). Consequently, the design and operational configuration of the cellular network determined by cell planning may not be optimal for an environment that differs from the assumed static nominal environment. This results in the cellular network being in a sub-optimal state during short-term or long-term environmental changes. Example environmental changes include a temporary increase in traffic due to a particular user event (e.g., a music concert or a sporting event), construction or destruction of a building that changes signal propagation paths, and changing weather conditions that affect signal propagation. Additionally, in cases in which cell planning is time intensive or costly, it may not be feasible to periodically perform cell planning to update the design or operational configuration of the cellular network based on these environmental changes. It is therefore challenging to dynamically optimize the cellular network and account for both short-term and long-term environmental changes.

SUMMARY

Techniques and apparatuses are described for optimizing a cellular network using machine learning. In particular, a network-optimization controller uses machine learning to determine an optimized network-configuration parameter that affects a performance metric of the cellular network. To make this determination, the network-optimization controller requests and analyzes gradient-report messages from one or more user equipments (UEs), one or more base stations, or combinations thereof. The gradient-report messages specify an amount of change in the performance metric relative to an amount of change in the network-configuration parameter (e.g., a gradient of the performance metric relative to the network-configuration parameter). The network-optimization controller directs the UEs or the base stations to use the determined optimized network-configuration parameter to improve performance of the cellular network. In this manner, the network-optimization controller dynamically optimizes the cellular network to account for both short-term and long-term environmental changes.

While other techniques may optimize performance of a single entity within the cellular network, the machine learning enables the network-optimization controller to evaluate gradients from a group of entities within the cellular network to determine the optimized network-configuration parameter that optimizes performance for these entities as a group. The machine learning also enables the network-optimization controller to identify different optimized network-configuration parameters associated with different local optima or global optima of an optimization function. In contrast, other techniques may approach a single optima of the optimization function and be unable to determine whether or not another optima exists. With the ability to explore and evaluate multiple optima using machine learning, the network-optimization controller determines an optimized network-configuration parameter that is appropriate for a given environment. Additionally, the network-optimization controller can provide feedback that assists with cell planning.

Aspects described below include a method performed by a network-optimization controller. The method includes determining a performance metric to optimize for a cellular network and determining at least one network-configuration parameter that affects the performance metric. The method also includes sending a gradient-request message to multiple base stations that directs multiple wireless transceivers to respectively evaluate gradients of the performance metric relative to the at least one network-configuration parameter. The method additionally includes receiving, from the multiple base stations, gradient-report messages generated by the multiple wireless transceivers. The gradient-report messages respectively include the gradients. The method further includes analyzing the gradients using machine learning to determine at least one optimized network-configuration parameter and sending an optimization message to at least one of the multiple base stations that directs at least one of the multiple wireless transceivers to use the at least one optimized network-configuration parameter.

Aspects described below also include a system with means for optimizing a cellular network using machine learning.

BRIEF DESCRIPTION OF THE DRAWINGS

Apparatuses of and techniques for optimizing a cellular network using machine learning are described with reference to the following drawings. The same numbers are used throughout the drawings to reference like features and components.

DETAILED DESCRIPTION

Overview

Figure 1:
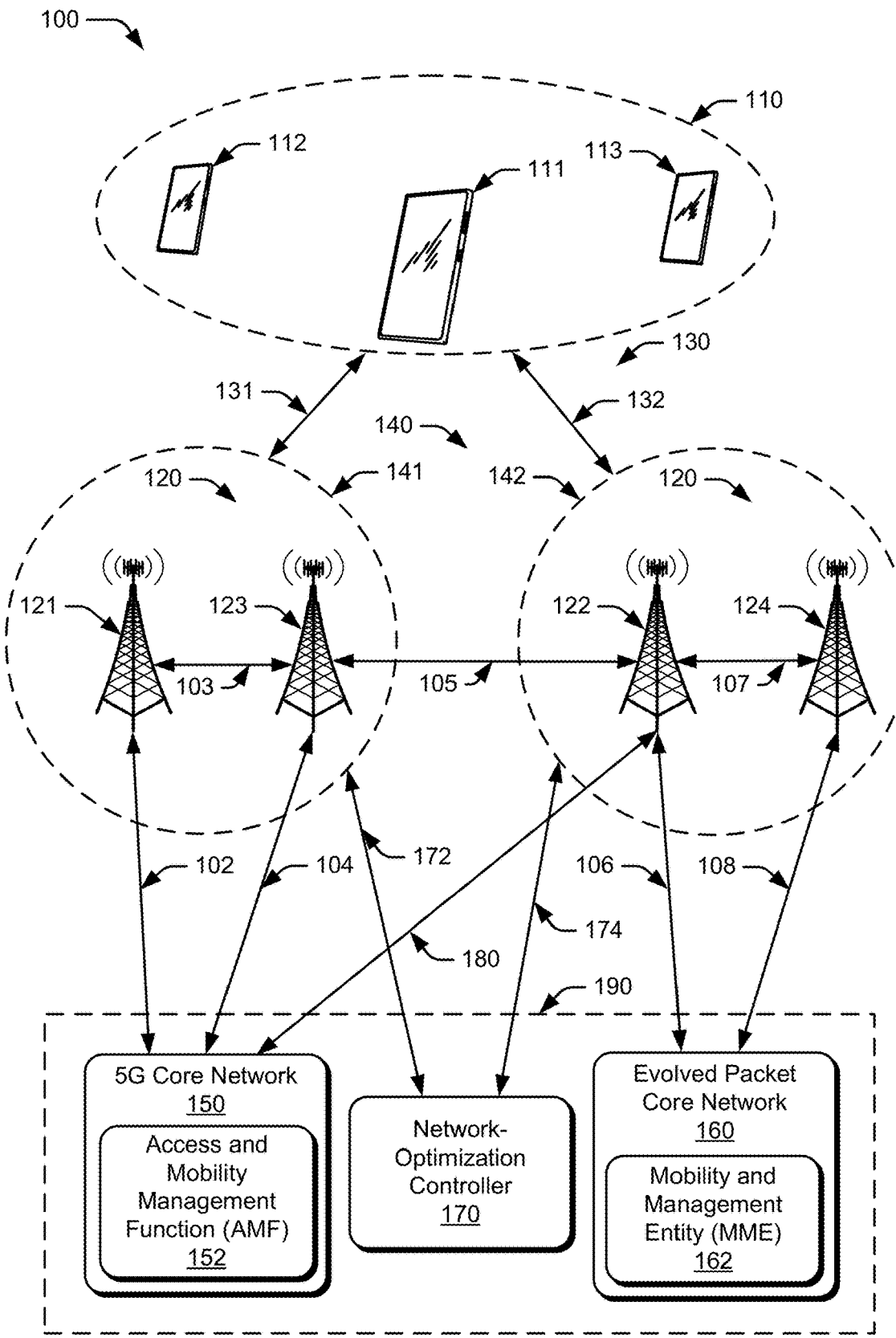
FIG. 1 illustrates an example wireless network environment in which optimizing a cellular network using machine learning can be implemented.

Cell planning determines a design and operational configuration of a cellular network based on a static nominal environment (e.g., a particular population density, a particular topography, a particular clutter or land use classification, or a particular type of weather). As such, the design and operational configuration of the cellular network determined by cell planning may not be optimal for an environment that differs from the static nominal environment. This results in the cellular network being in a sub-optimal state during short-term or long-term environmental changes. Example environmental changes include a temporary increase in traffic due to a particular user event (e.g., a music concert or a sporting event), construction or destruction of a building that changes signal propagation paths, or changing weather conditions that affect signal propagation. Additionally, in cases in which cell planning is time intensive or costly, it may not be feasible to periodically perform cell planning to update the design or operational configuration of the cellular network based on these environmental changes. It is therefore challenging to dynamically optimize the cellular network to account for both short-term and long-term environmental changes.

To address this challenge, techniques are described for optimizing a cellular network using machine learning. In particular, a network-optimization controller uses machine learning to determine an optimized network-configuration parameter that affects a performance metric of the cellular network. To make this determination, the network-optimization controller requests and analyzes gradient-report messages from one or more user equipments (UEs), one or more base stations, or combinations thereof. The gradient-report messages specify an amount of change in the performance metric relative to an amount of change in the network-configuration parameter (e.g., a gradient of the performance metric relative to the network-configuration parameter). The network-optimization controller directs the UEs or the base stations to use the determined optimized network-configuration parameter to improve performance of the cellular network. In this manner, the network-optimization controller dynamically optimizes the cellular network to account for both short-term and long-term environmental changes.

While other techniques may optimize performance of a single entity within the cellular network, the machine learning enables the network-optimization controller to evaluate gradients from a group of entities within the cellular network to determine the optimized network-configuration parameter that optimizes performance for these entities as a group. The machine learning also enables the network-optimization controller to identify different optimized network-configuration parameters associated with different local optima or global optima of an optimization function. In contrast, other techniques may approach a single optima of the optimization function and be unable to determine whether or not another optima exists. With the ability to explore and evaluate multiple optima using machine learning, the network-optimization controller determines an optimized network-configuration parameter that is appropriate for a given environment. Additionally, the network-optimization controller can provide feedback that assists with cell planning.

Example Environment

FIG. 1 illustrates an example environment 100 in which optimizing a cellular network using machine learning can be implemented. The environment 100 includes multiple user equipment 110 (UE 110), illustrated as UE 111, UE 112, and UE 113. Each UE 110 communicates with base stations 120 (illustrated as base stations 121, 122, 123, and 124) through one or more wireless communication links 130 (wireless link 130), illustrated as wireless links 131 and 132. For simplicity, the UE 110 is implemented as a smartphone but may be implemented as any suitable computing or electronic device, such as a mobile communication device, modem, cellular phone, gaming device, navigation device, media device, laptop computer, desktop computer, tablet computer, smart appliance, vehicle-based communication system, or an Internet-of-Things (IoT) device such as a sensor or an actuator. The base station 120 (e.g., an Evolved Universal Terrestrial Radio Access Network Node B, E-UTRAN Node B, evolved Node B, eNodeB, eNB, Next Generation Evolved Node B, ng-eNB, Next Generation Node B, gNode B, gNB, or the like) can be implemented in a macrocell, microcell, small cell, picocell, distributed base station, or the like, or any combination or future evolution thereof.

The base stations 120 communicate with the UE 110 using the wireless links 131 and 132, which may be implemented as any suitable type of wireless link. The wireless links 131 and 132 include control and data communication, such as downlink of data and control information communicated from the base stations 120 to the UE 110, uplink of other data and control information communicated from the UE 110 to the base stations 120, or both. The wireless links 130 include one or more wireless links (e.g., radio links) or bearers implemented using any suitable communication protocol or standard, or combination of communication protocols or standards such as 3rd Generation Partnership Project Long-Term Evolution (3GPP LTE), Enhanced Long-Term Evolution (eLTE), 5th-Generation New Radio (5G NR), 4th-Generation (4G) standard, and so forth. Multiple wireless links 130 can be aggregated using carrier aggregation or multi-connectivity to provide a higher data rate for the UE 110. Multiple wireless links 130 from multiple base stations 120 can be configured for Coordinated Multipoint (CoMP) communication with the UE 110.

The base stations 120 are collectively a Radio Access Network 140 (e.g., RAN, Evolved Universal Terrestrial Radio Access Network, E-UTRAN, 5G NR RAN or NR RAN) that each use a Radio Access Technology (RAT). The RANs 140 are illustrated as an NR RAN 141 and an E-UTRAN 142. In FIG. 1, core networks 190 include a 5th-Generation Core (5GC) network 150 (5GC 150) and an Evolved Packet Core (EPC) network 160 (EPC 160), which are different types of core networks. The base stations 121 and 123 in the NR RAN 141 connect to the 5GC 150. The base stations 122 and 124 in the E-UTRAN 142 connect to the EPC 160. Optionally or additionally, the base station 122 can connect to both the 5GC 150 and EPC 160 networks.

The base stations 121 and 123 connect, at 102 and 104 respectively, to the 5GC 150 through an NG2 interface for control-plane signaling and using an NG3 interface for user-plane data communications. The base stations 122 and 124 connect, at 106 and 108 respectively, to the EPC 160 using an S1 interface for control-plane signaling and user-plane data communications. Optionally or additionally, if the base station 122 connects to the 5GC 150 and the EPC 160 networks, the base station 122 connects to the 5GC 150 using an NG2 interface for control-plane signaling and through an NG3 interface for user-plane data communications, at 180.

In addition to connections to core networks 190, the base stations 120 can communicate with each other. For example, the base stations 121 and 123 communicate using an Xn Application Protocol (XnAP) through an Xn interface at 103, the base stations 122 and 123 communicate through an Xn interface at 105, and the base stations 122 and 124 communicate through an X2 interface at 107.

The 5GC 150 includes an Access and Mobility Management Function 152 (AMF 152), which provides control-plane functions, such as registration and authentication of multiple UE 110, authorization, and mobility management in the 5G NR network. The EPC 160 includes a Mobility Management Entity 162 (MME 162), which provides control-plane functions, such as registration and authentication of multiple UE 110, authorization, or mobility management in the E-UTRAN network. The AMF 152 and the MME 162 communicate with the base stations 120 in the RANs 140 and also communicate with multiple UE 110 using the base stations 120.

In the environment 100, the core network 190 includes a network-optimization controller 170, which can be integrated as part of the core network 190 (e.g., as part of the 5GC 150 or the EPC 160) or can be implemented within a server of the core network 190. The base stations 121 and 123 within the RAN 141 connect to the network-optimization controller 170 at 172. Similarly, the base stations 122 and 124 within the RAN 142 connect to the network-optimization controller 170 at 174.

The network-optimization controller 170 uses machine learning to analyze gradient-report messages generated by the UEs 110 or the base stations 120. With machine learning, the network-optimization controller 170 determines an optimized network-configuration parameter that improves performance of the cellular network for a current environment. In some cases, the network-optimization controller provides feedback that assists with cell planning. Components of the UE 110 and the base station 120 are further described with respect to FIG. 2, and components of the network-optimization controller 170 are further described with respect to FIG. 3.

Example Devices

Figure 2:
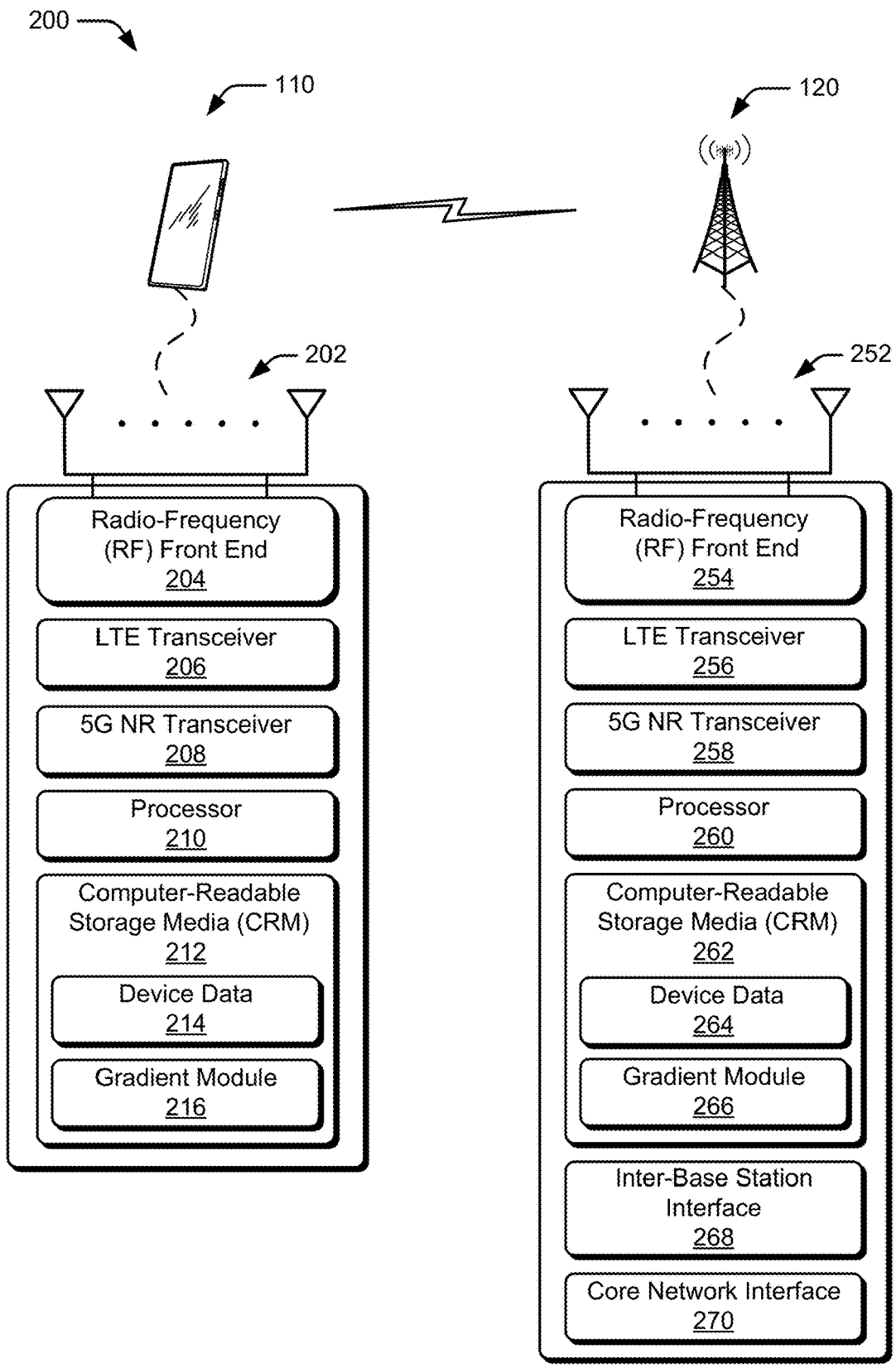
FIG. 2 illustrates an example device diagram of a user equipment and a base station for optimizing a cellular network using machine learning.

FIG. 2 illustrates an example device diagram 200 of the UE 110 and the base station 120. The UE 110 and the base station 120 can include additional functions and interfaces that are omitted from FIG. 2 for the sake of clarity. The UE 110 includes antennas 202, a radio-frequency (RF) front end 204 (RF front end 204), an LTE transceiver 206, and a 5G NR transceiver 208 for communicating with one or more base stations 120 in the RAN 140. The RF front end 204 couples or connects the LTE transceiver 206 and the 5G NR transceiver 208 to the antennas 202 to facilitate various types of wireless communication. The antennas 202 can include an array of multiple antennas that are configured similar to or differently from each other. The antennas 202 and the RF front end 204 are tuned to one or more frequency bands defined by the 3GPP LTE and 5G NR communication standards and implemented by the LTE transceiver 206 and/or the 5G NR transceiver 208.

The UE 110 also includes one or more processors 210 and computer-readable storage media 212 (CRM 212). The processor 210 can be a single core processor or a multiple core processor composed of a variety of materials, such as silicon, polysilicon, high-K dielectric, copper, and so on. The computer-readable storage media excludes propagating signals and the CRM 212 includes any suitable memory or storage device, such as random-access memory (RAM), static RAM (SRAM), dynamic RAM (DRAM), non-volatile RAM (NVRAM), read-only memory (ROM), or Flash memory useable to store device data 214 of the UE 110. The device data 214 includes user data, multimedia data, beamforming codebooks, applications, and/or an operating system of the UE 110, which are executable by the processor 210 to enable user-plane communication, control-plane signaling, and user interaction with the UE 110.

The CRM 212 also includes a gradient module 216. Alternately or additionally, the gradient module 216 can be implemented in whole or part as hardware logic or circuitry integrated with or separate from other components of the UE 110. The gradient module 216 evaluates one or more gradients and generates one or more gradient-report messages for optimizing the cellular network, as further described with respect to FIG. 4. Example messaging transactions performed using the gradient module 216 are further described with respect to FIG. 5.

The device diagram for the base station 120 includes a single network node (e.g., a gNB). The functionality of the base station 120 can be distributed across multiple network nodes or devices in any fashion suitable to perform the described functions. The base station 120 includes antennas 252, a radio-frequency (RF) front end 254, one or more LTE transceivers 256, and/or one or more 5G NR transceivers 258 for communicating with the UE 110. The RF front end 254 couples or connects the LTE transceiver 256 and the 5G NR transceiver 258 to the antennas 252 to facilitate various types of wireless communication. The antennas 252 can include an array of multiple antennas that are configured similar to or differently from each other. The antennas 252 and the RF front end 254 are tuned to one or more frequency bands defined by the 3GPP LTE and 5G NR communication standards, and implemented by the LTE transceiver 256, and/or the 5G NR transceiver 258. Additionally, the antennas 252, the RF front end 254, the LTE transceiver 256, and/or the 5G NR transceiver 258 can support beamforming, such as Massive-MIMO, for the transmission and reception of communications with the UE 110.

The base station 120 also includes one or more processors 260 and computer-readable storage media 262 (CRM 262). The processor 260 can be a single core processor or a multiple core processor composed of a variety of materials, such as silicon, polysilicon, high-K dielectric, copper, and so on. The CRM 262 includes any suitable memory or storage device as described with respect to the CRM 212. The CRM 262 stores device data 264 of the base station 120. The device data 264 includes network scheduling data, radio resource management data, beamforming codebooks, applications, and/or an operating system of the base station 120, which are executable by the processor 260 to enable communication with the UE 110.

The CRM 262 also includes a gradient module 266. Alternately or additionally, the gradient module 266 can be implemented in whole or part as hardware logic or circuitry integrated with or separate from other components of the base station 120. In at least some aspects, the gradient module 266 configures the LTE transceiver 256 and the 5G NR transceiver 258 for communication with the UE 110. The gradient module 266 evaluates one or more gradients and generates one or more gradient-report messages for optimizing the cellular network, as further described with respect to FIG. 4. Example messaging transactions that can be performed using the gradient module 266 are further described with respect to FIG. 6.

The base station 120 includes an inter-base station interface 268, such as an Xn and/or X2 interface, to exchange user-plane and control-plane data with another base station 120 and coordinate communications between the base stations 120 with the UE 110. The base station 120 also includes a core network interface 270 to exchange information with core network functions and entities, including the network-optimization controller 170.

Figure 3:
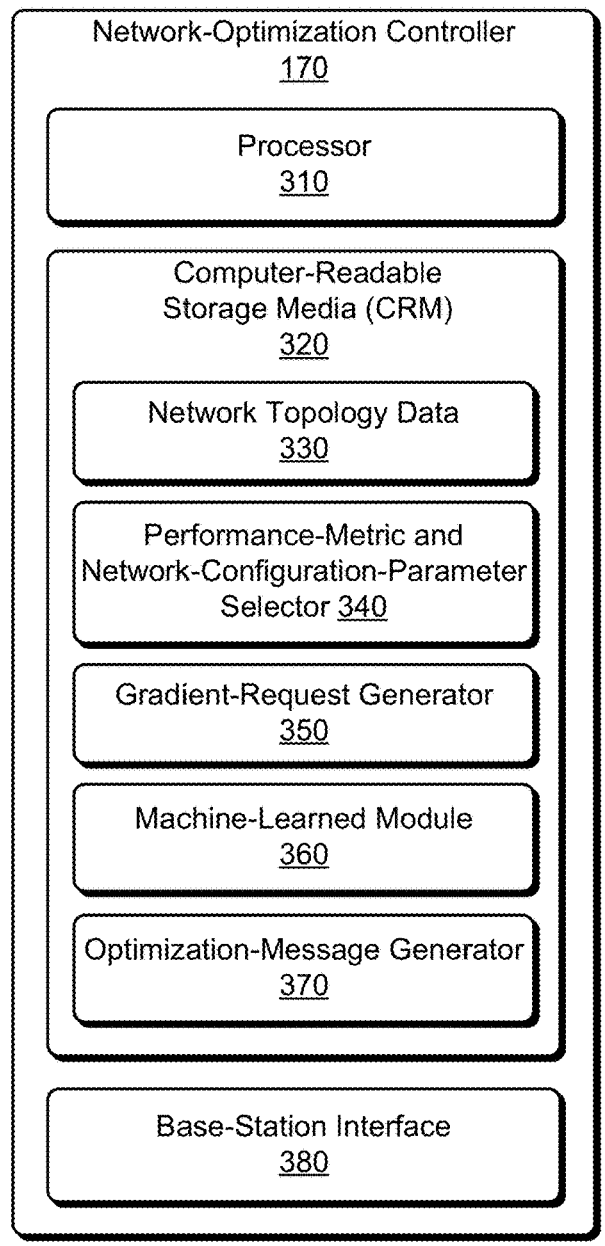
FIG. 3 illustrates an example device diagram of a network-optimization controller for optimizing a cellular network using machine learning.

FIG. 3 illustrates an example device diagram 300 of the network-optimization controller 170 for optimizing a cellular network using machine learning. The network-optimization controller 170 includes one or more processors 310 and computer-readable storage media 320 (CRM 320). The processor 310 can be a single core processor or a multiple core processor composed of a variety of materials, such as silicon, polysilicon, high-K dielectric, copper, and so on. The CRM 320 excludes propagating signals and includes any suitable memory or storage device, such as random-access memory (RAM), static RAM (SRAM), dynamic RAM (DRAM), non-volatile RAM (NVRAM), read-only memory (ROM), or Flash memory useable to store data of the network-optimization controller 170. The data can include network topology data 330, which specifies a quantity of base stations 120, a quantity of UEs 110 attached to (e.g., in communication with) the base stations 120, locations of the base stations 120, configurations of the base stations 120, capabilities of the base stations 120, a topographic map, land-use data, and so forth. The CRM 320 also includes a performance-metric and network-configuration-parameter selector 340, a gradient-request generator 350, a machine-learned module 360, and an optimization-message generator 370.

The machine-learned module 360 is implemented using one or more neural networks. A neural network includes a group of connected nodes (e.g., neurons or perceptrons), which are organized into one or more layers. As an example, the machine-learned module 360 includes a deep neural network, which includes an input layer, an output layer, and one or more hidden layers positioned between the input layer and the output layers. The nodes of the deep neural network can be partially-connected or fully-connected between the layers.

In some implementations, the neural network is a recurrent neural network (e.g., a long short-term memory (LSTM) neural network) with connections between nodes forming a cycle to retain information from a previous portion of an input data sequence for a subsequent portion of the input data sequence. In other cases, the neural network is a feed-forward neural network in which the connections between the nodes do not form a cycle. Additionally or alternatively, the machine-learned module 360 includes another type of neural network, such as a convolutional neural network. The machine-learned module 360 can also include one or more types of regression models, such as a single linear regression model, multiple linear regression models, logistic regression models, step-wise regression models, multi-variate adaptive regression splines, locally estimated scatterplot smoothing models, and so forth.

The network-optimization controller 170 further includes a base-station interface 380 to exchange information with the base stations 120. Operations of the performance-metric and network-configuration-parameter selector 340, the gradient-request generator 350, the machine-learned module 360, and the optimization-message generator 370 are further described with respect to FIG. 4.

Optimizing a Cellular Network Using Machine Learning

Figure 4:
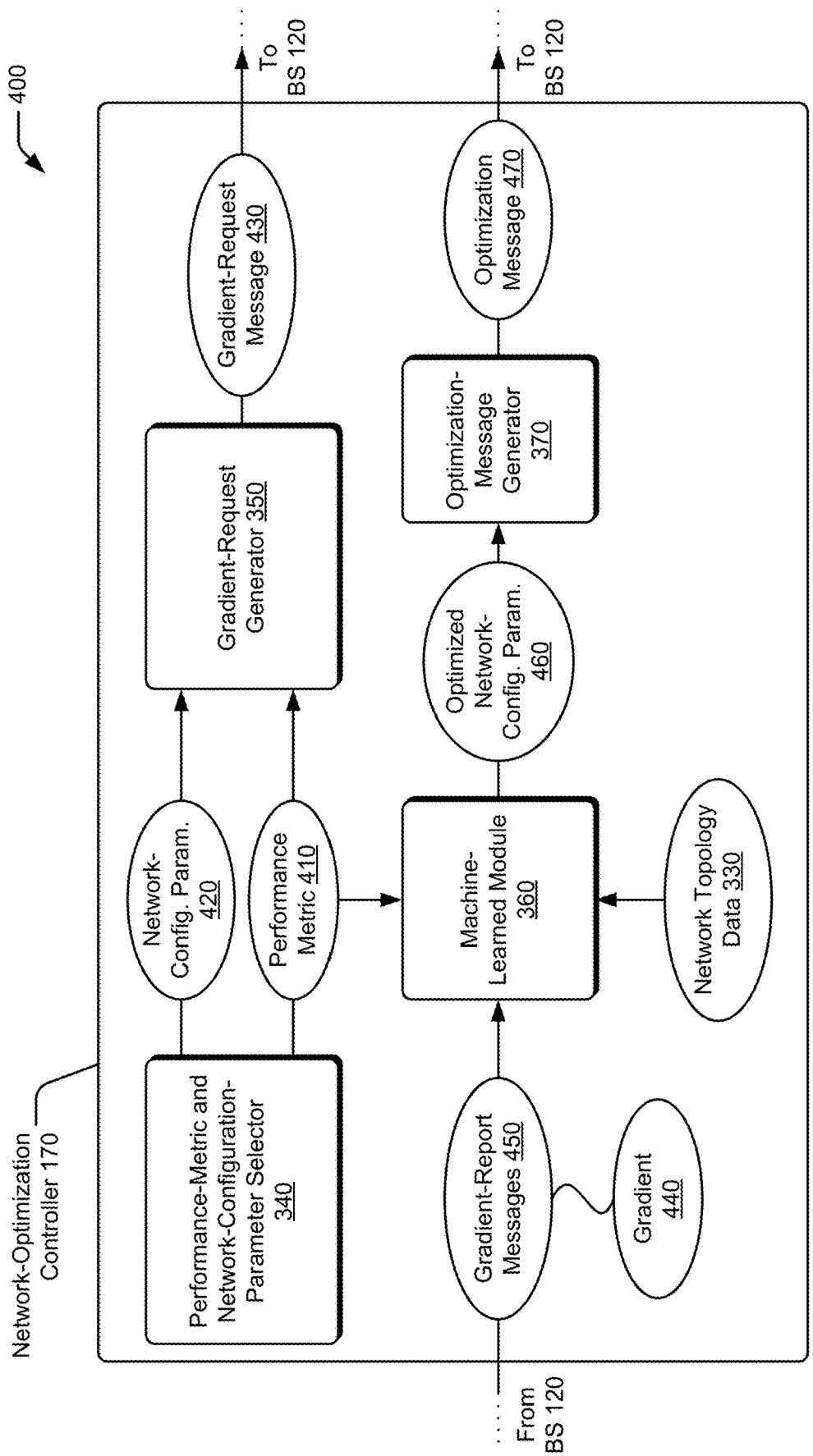
FIG. 4 illustrates an example functional diagram of a network-optimization controller for optimizing a cellular network using machine learning.

FIG. 4 illustrates an example functional diagram 400 of the network-optimization controller 170 for optimizing a cellular network using machine learning. The performance-metric and network-configuration-parameter selector 340 determines at least one performance metric 410 to optimize for the cellular network (e.g., one or more radio-access networks 140 of FIG. 1). Example types of performance metrics 410 include spectrum efficiency, network capacity, cell-edge capacity, packet latency, jitter, total network interference, signal-to-interference-plus-noise ratio (SINR), received signal strength indication (RSSI), reference signal received power (RSRP), reference signal received quality (RSRQ), bit-error rate (BER), packet-error rate, transmit power headroom, and transmit power.

The performance-metric and network-configuration-parameter selector 340 also proposes at least one network-configuration parameter 420 that may affect the performance metric 410. In other words, a change in a particular network-configuration parameter 420 may cause a change in the measured performance metric 410. The proposed network-configuration parameter 420 represents an operational configuration or a change in an operational configuration of one or more UEs 110 or one or more base stations 120. Because some network-configuration parameters interact with others, a proposed set of network-configuration parameters can vary greatly in the number of parameters specified.

Example types of network-configuration parameters 420 that are associated with the UEs 110 include an uplink transmit power configuration, a time-multiplexed pilot pattern, a data tone power, an uplink time-slot allocation percentage, a subframe configuration, a multi-user scheduling configuration, and a random-access configuration. Example types of network-configuration parameters 420 associated with the base stations 120 include a downlink transmit power configuration, an antenna array configuration, a phase-code interval (PCI), a time-multiplexed pilot pattern, a data tone power, a data-to-pilot power ratio, a downlink time-slot allocation percentage, a subframe configuration, a handover configuration, and a multi-user scheduling configuration. Example types of subframe configurations include a multimedia-broadcast/multimedia-service (MBMS) subframe configuration, a time-division-duplexing (TDD) special subframe configuration, a special subframe configuration, an uplink allocation configuration, a downlink allocation configuration, or a guard period configuration.

In general, the performance-metric and network-configuration-parameter selector 340 provides a proposed network-configuration parameter 420 that differs from a current network-configuration parameter 420 presently used by the UEs 110 or the base stations 120. In some cases, the performance-metric and network-configuration-parameter selector 340 provides a proposed set of network-configuration parameters 420 with one or more of the network-configuration parameters 420 within the set differing from a corresponding current network-configuration parameter 420 presently used by the UEs 110 or the base stations 120. In general, the UEs 110 and the base stations 120 can operate with many different types of network-configuration parameters 420. As such, the performance-metric and network-configuration parameter selector 340 can provide one or more network-configuration parameters 420 for incrementally, sequentially, or concurrently evaluating multiple gradients.

The gradient-request generator 350 generates at least one gradient-request message 430, which includes the performance metric 410 and the proposed network-configuration parameter 420. The network-optimization controller 170 sends the gradient-request message 430 to the base stations 120. In some cases, the gradient-request message 430 directs the base stations 120 to communicate the gradient-request message 430 to the UEs 110, as further described with respect to FIG. 5.

The gradient-request message 430 directs the UEs 110 or the base stations 120 to individually evaluate a gradient 440 (e.g., a slope) of the performance metric 410 relative to the proposed network-configuration parameter 420. Additionally, the gradient-request message 430 directs the UEs 110 or the base stations 120 to individually generate a gradient-report message 450 to provide the determined gradient 440 to the network-optimization controller 170. The gradient-request message 430 can be applied to individual UEs 110 or base stations 120, groups of UEs 110 or base stations 120, the UEs 110 or base stations 120 within a particular cell or geographical location, and so forth. In different situations, the base stations 120 individually forward the gradient-request message 430 to the UEs 110 or multicast or broadcast the gradient-request message 430 to the UEs 110.

The gradient 440 specifies a first amount of change (e.g., an increase or a decrease) in the performance metric 410 relative to a second amount of change in the network-configuration parameter 420. For example, the gradient 440 specifies an amount of increase in the spectrum efficiency per decibel decrease in the transmit power level of a neighboring base station 120 that generates interference. The first amount of increase in the spectrum efficiency is in units of bits-per-second per hertz (bps/Hz), for instance. As another example, the gradient 440 specifies an amount of increase in network capacity per decibel increase in transmission power of the UEs 110 or the base stations 120. In yet another example, the gradient 440 specifies a decrease in total network interference per decibel decrease in transmit power of the base stations 120. In some cases, the gradient-report messages 450 respectively include locations or identifiers of the UEs 110 or the base stations 120 to enable the machine-learned module 360 to associate the gradients 440 with the network topology data 330.

The machine-learned module 360 analyzes the gradients 440 that are provided by the gradient-report messages 450 to determine at least one optimized network-configuration parameter 460. In particular, the machine-learned module 360 uses reinforcement learning to optimize a utility function or a cost function associated with the performance metric 410 based on the gradients 440. Using techniques such as gradient ascent or gradient descent, the machine-learned module 360 determines an optimized network-configuration parameter 460 (or set of parameters) that is associated with a local optima or a global optima of the utility function or the cost function. In some cases, the machine-learned module 360 determines a single optimized network-configuration parameter 460 that is applied to multiple UEs 110 or multiple base stations 120. Alternatively or in addition, the machine-learned module 360 determines respective optimized network-configuration parameters 460 for individual UEs 110 or individual base stations 120.

For gradient ascent or gradient descent, the network-optimization controller 170 can send sequential gradient-request messages 430 that incrementally change the network-configuration parameter 420 used to evaluate the gradient 440. In some cases, this change can be relatively large to enable the machine-learned module 360 to explore different local optima or identify a global optima. In other cases, the change can be relatively small to enable the machine-learned module 360 to approach the peak or valley of a particular optima.

To account for short-term environmental changes, the network-optimization controller 170 identifies a local optima and determines the optimized network-configuration parameter 460 based on the local optima. To account for long-term environmental changes, the network-optimization controller 170 identifies the global optima and determines the optimized network-configuration parameter 460 based on the global optima. Generally, the determined optimized network-configuration parameter 460 maximizes an output of the utility function or minimizes an output of the cost function.

In some cases, the machine-learned module 360 determines different optimized network-configuration parameters 460 for different entities within the cellular network (e.g., for individual UEs 110 or for individual base stations 120). Optionally, the machine-learned module 360 analyzes the network topology data 330 and determines the optimized network-configuration parameter 460 based on the network topology data 330.

The optimization-message generator 370 generates an optimization message 470, which includes the optimized network-configuration parameter 460. The network-optimization controller 170 sends the optimization message 470 to the base stations 120. If the optimized network-configuration parameter 460 is associated with the UEs 110, the network-optimization controller 170 directs the base stations 120 to pass the optimization message 470 to the UEs 110 and directs the UEs 110 to use the optimized network-configuration parameter 460, as described in FIG. 5. Alternatively, if the optimized network-configuration parameter 460 is associated with the base stations 120, the network-optimization controller 170 directs the base stations 120 to use the optimized network-configuration parameter 460, as described in FIG. 6.

Figure 5:
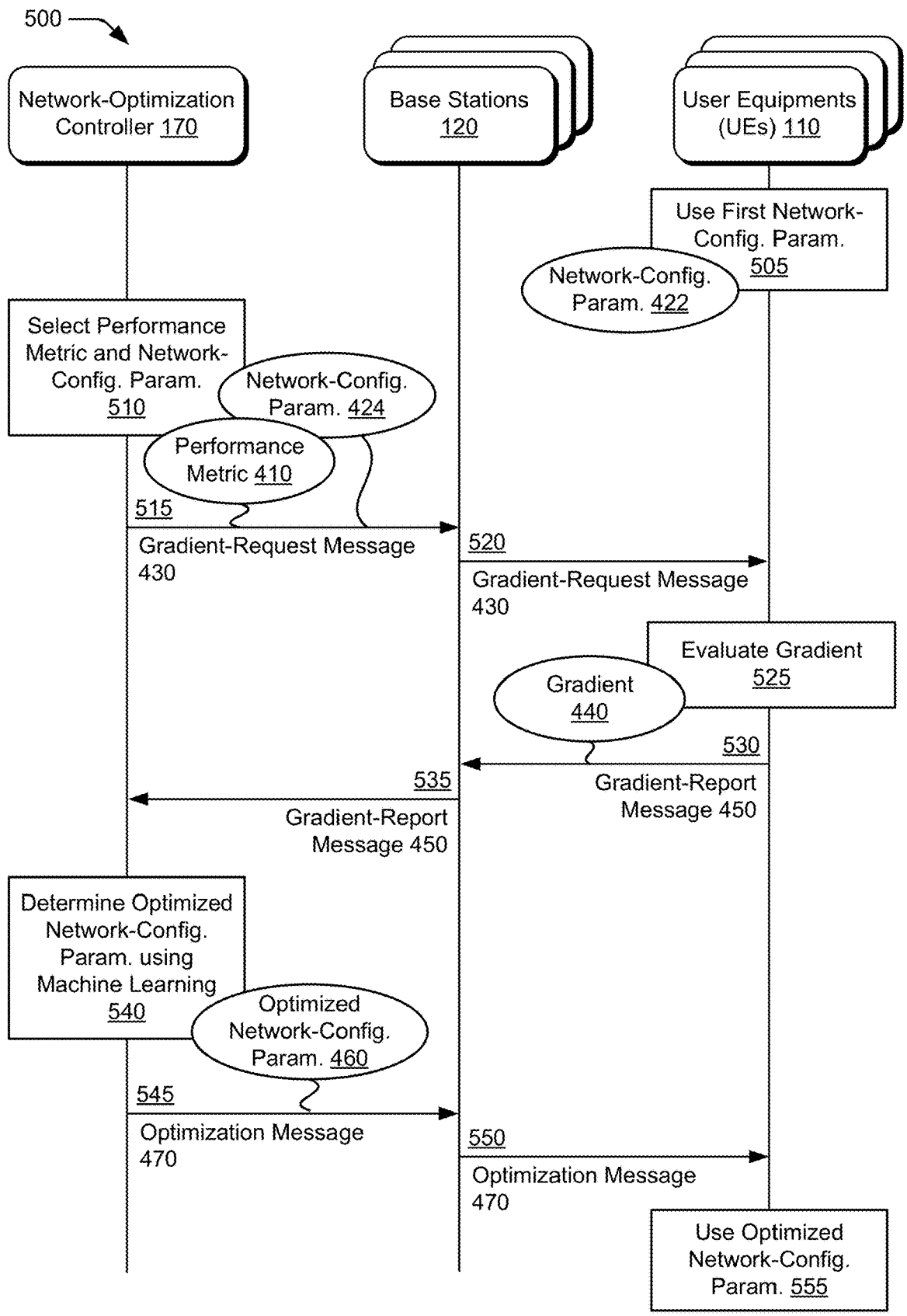
FIG. 5 illustrates example messaging transactions between a network-optimization controller, one or more base stations, and one or more user equipments for optimizing a cellular network using machine learning.

FIG. 5 illustrates example messaging transactions 500 between the network-optimization controller 170, one or more base stations 120, and one or more user equipments 110 for optimizing a cellular network using machine learning. These messaging transactions occur when the network-optimization controller 170 selects one or more network-configuration parameters 420 that are associated with the UEs 110 but not the base stations 120.

At 505, the UEs 110 operate with at least a first network-configuration parameter 422. The at least one first network-configuration parameter 422 can include a first uplink transmit power configuration, a first time-multiplexed pilot pattern, a first data tone power, a first uplink slot allocation percentage, a first subframe configuration, a first multi-user scheduling configuration, a first random-access configuration, or some combination thereof.

At 510, the network-optimization controller 170 selects the performance metric 410 and at least one second network-configuration parameter 424, as described above with respect to FIG. 4. The at least one second network-configuration parameter 424 differs from the at least one first network-configuration parameter 422. If the second network-configuration parameter 424 includes a set of network-configuration parameters 420, at least one parameter within the set differs from the first network-configuration parameter 422 that is presently used by the UEs 110. The second network-configuration parameter 424 includes, for instance, a second uplink transmit power configuration, a second phase-code interval (PCI), a second time-multiplexed pilot pattern, a second data tone power, a second uplink slot allocation percentage, a second subframe configuration, a second multi-user scheduling configuration, a second random-access configuration, or some combination thereof. Alternatively, the at least one second network-configuration parameter 424 specifies a delta change to the at least one first network-configuration parameter 422.

At 515, the network-optimization controller 170 generates a gradient-request message 430 and sends the gradient-request message 430 to the base stations 120. The gradient-request message 430 includes the performance metric 410 and the at least one second network-configuration parameter 424.

At 520, the base stations 120 pass the gradient-request message 430 to the UEs 110 that are attached to (e.g., in communication with) the base stations 120. In some cases, the base stations 120 individually forward the gradient-request message 430 to different UEs 110. In other cases, the base stations 120 broadcast or multicast the gradient-request message 430 to the UEs 110. The base stations 120 send Layer 3 messages to the UEs 110 to direct the UEs 110 to evaluate a gradient 440.

At 525, the UEs 110 individually evaluate a gradient 440 of the performance metric 410 with respect to the second network-configuration parameter 424. In some cases, the base stations 120 assist the UEs 110 in determining the gradient 440. For example, if the second network-configuration parameter 424 is the second uplink transmit power configuration, the base stations 120 measure the performance metric 410 while the UEs 110 operate according to the second uplink transmit power configuration. As described above, the second network-configuration parameter 424 can specify a particular operational configuration (e.g., a particular transmit power level) or a relative amount of change that is applied to respective operational configurations of the individual UEs 110 (e.g., a delta transmit power level).

A variety of different techniques can be used to evaluate the gradient 440. In one example, the UEs 110 or base stations 120 determine the gradient 440 by measuring a change in the performance metric 410 caused by the UEs 110 switching from operating with the first network-configuration parameter 422 to operating with the second network-configuration parameter 424. In this case, the gradient 440 is determined based on two data points.

To improve an accuracy of the gradient 440, the gradient-request message 430 can further specify an incremental amount of change that is to be applied to the second network-configuration parameter 424 over a given time window. In some cases, the gradient-request message 430 further specifies times at which to apply these changes. As such, the gradient-request message 430 directs the UEs 110 to incrementally adjust the second network-configuration parameter 424 and determine the resulting performance metric 410. This enables more than two data points to be measured for determining the gradient 440. The UEs 110 can apply regression techniques, such as linear regression, to determine the gradient 440 and improve an accuracy of the gradient 440 relative to techniques that determine the gradient 440 using only two data points.

At 530 (or as part of a cooperative version of the evaluation process 525), the UEs 110 send gradient-report messages 450 to the base stations 120. The gradient-report messages 450 respectively include the gradients 440 determined by the UEs 110.

At 535, the base stations 120 pass the gradient-report messages 450 to the network-optimization controller 170.

At 540, the network-optimization controller 170 uses machine learning to determine at least one optimized network-configuration parameter 460, as described above with respect to FIG. 4.

At 545, the network-optimization controller 170 sends an optimization message 470 to the base stations 120. Depending on the machine-learned module 360's output and the structure of the optimization message 470, different base stations 120 may receive different optimization messages 470 or the base stations 120 may receive identical optimization messages 470. The optimization message 470 includes the at least one optimized network-configuration parameter 460 and may direct the base stations 120 to pass the optimization message 470 (perhaps in a modified format) to the UEs 110.

At 550, the base stations 120 pass the optimization message 470 to the UEs 110. Like the gradient-request message 430, each base station 120 may individually send optimization messages 470 to different UEs 110 or may broadcast or multicast a single optimization message to the UEs 110. Through the optimization message 470, the network-optimization controller 170 directs the UEs 110 to use the optimized network-configuration parameter 460.

At 555, the UEs 110 operate with the at least one optimized network-configuration parameter 460. By using the optimized network-configuration parameter 460, the performance of the UEs 110 is optimized for the current environment. In some cases, the optimization message 470 may additionally or alternatively include one or more base-station-specific optimized network-configuration parameters 460, as further described with respect to FIG. 6.

Figure 6:
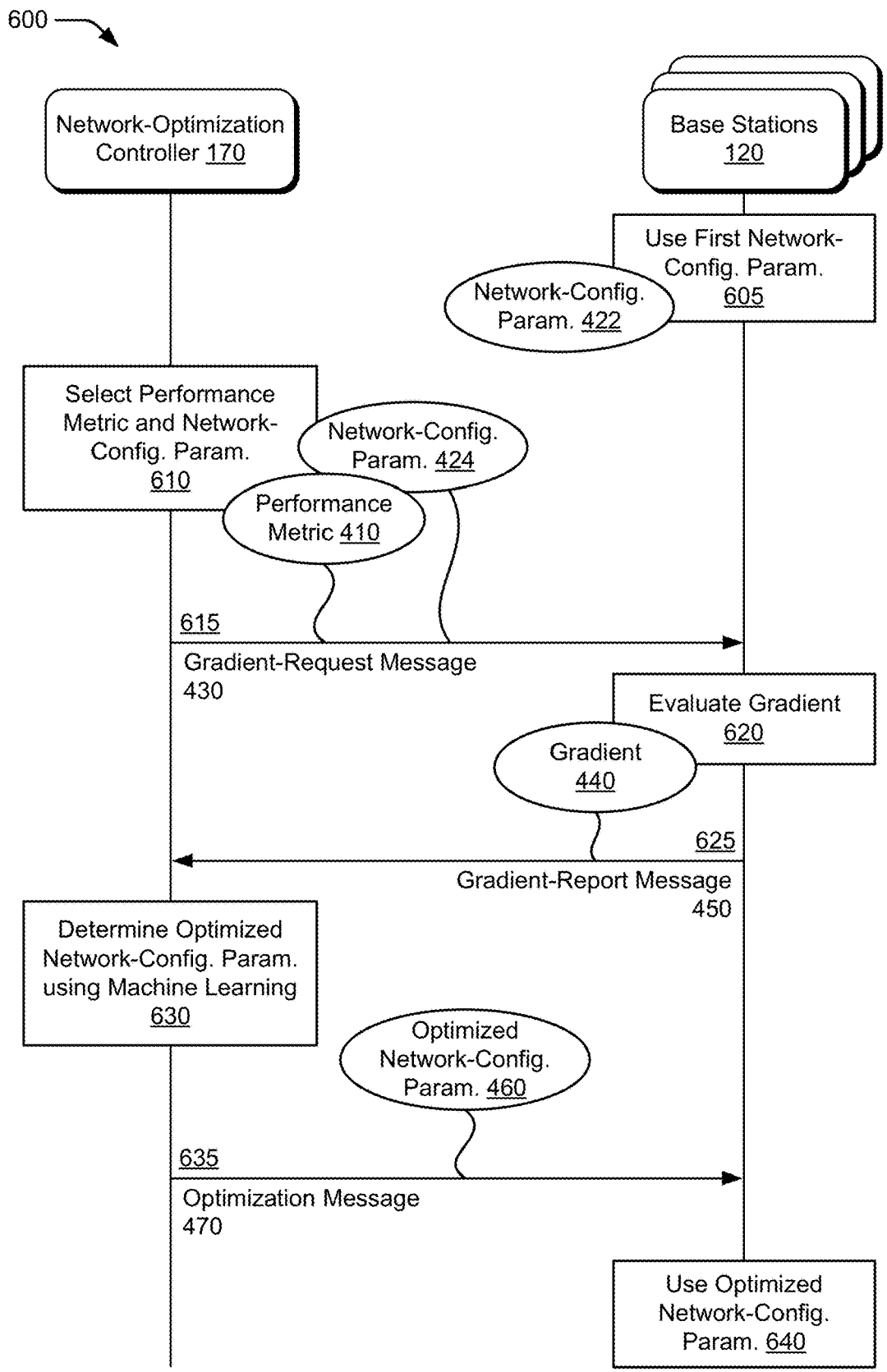
FIG. 6 illustrates example messaging transactions between a network-optimization controller and one or more base stations for optimizing a cellular network using machine learning.

FIG. 6 illustrates example messaging transactions 600 between the network-optimization controller 170 and one or more base stations 120 for optimizing a cellular network using machine learning. These messaging transactions occur when the network-optimization controller 170 selects one or more network-configuration parameters 420 that are associated with the base stations 120 but not the UEs 100.

At 605, the base stations 120 operate with at least one first network-configuration parameter 422. The at least one first network-configuration parameter 422 can include a first downlink transmit power configuration, a first antenna array configuration, a first PCI, a first time-multiplexed pilot pattern, a first data tone power, a first data-to-pilot power ratio, a first downlink slot allocation percentage, a first subframe configuration, a first handover configuration, a first multi-user scheduling configuration, or some combination thereof.

At 610, the network-optimization controller 170 selects the performance metric 410 and at least one second network-configuration parameter 424, as described above with respect to FIG. 4. The second network-configuration parameter 424 differs from the first network-configuration parameter 422. If the second network-configuration parameter 424 includes a set of network-configuration parameters 420, at least one parameter within the set differs from the first network-configuration parameter 422 that is presently used by the base stations 120. The second network-configuration parameter 424 includes, for instance, a second downlink transmit power configuration, a second antenna array configuration, a second PCI, a second time-multiplexed pilot pattern, a second data tone power, a second downlink slot allocation percentage, a second subframe configuration, a second handover configuration, a second multi-user scheduling configuration, or some combination thereof. Alternatively, the second network-configuration parameter 424 specifies a delta change to the first network-configuration parameter 422.

At 615, the network-optimization controller 170 generates a gradient-request message 430 and sends the gradient-request message 430 to one or more base stations 120. The gradient-request message 430 includes the performance metric 410 and the at least one second network-configuration parameter 424.

At 620, the base stations 120 individually evaluate a gradient 440 of the performance metric 410 with respect to the second network-configuration parameter 424. In some cases, the UEs 110 assist the base stations 120 in determining the gradient 440. For example, if the second network-configuration parameter 424 is the second downlink transmit power configuration, the UEs 110 measure the performance metric 410 while the base stations 120 operate according to the second downlink transmit power configuration. As described above, the second network-configuration parameter 424 can specify a particular operational configuration (e.g., a particular transmit power level) or a relative amount of change that is applied to respective operational configurations of the individual base stations 120 (e.g., a delta transmit power level). Similar to the techniques described in FIG. 5 with respect to the UEs 110, the base stations 120 can determine the gradient 440 using two data points or more than two data points.

At 625, the base stations 120 send gradient-report messages 450 to the network-optimization controller 170. The gradient-report messages 450 respectively include the gradients 440 determined by the base stations 120.

At 630, the network-optimization controller 170 uses machine learning to determine at least one optimized network-configuration parameter 460, as described above with respect to FIG. 4.

At 635, the network-optimization controller 170 sends an optimization message 470 to the base stations 120. Depending on the machine-learned module 360's output and the structure of the optimization message 470, different base stations 120 may receive different optimization messages 470 with different optimized network-configuration parameters 460 or all the analyzed based stations 120 may receive identical optimization messages 470 with a same optimized network-configuration parameter 460. The optimization message 470 includes the at least one optimized network-configuration parameter 460 and directs the base stations 120 to use the optimized network-configuration parameter 460.

At 640, the base stations 120 operate with the at least one optimized network-configuration parameter 460. By using the optimized network-configuration parameter 460, the performance of the base stations 120 is optimized for the current environment.

In both FIGS. 5 and 6, the network-optimization controller 170 can send multiple gradient-request messages 430 periodically or aperiodically to dynamically adjust the optimized network-configuration parameter 460 and account for short-term or long-term environmental changes. Although not explicitly shown, the network-optimization controller 170 can also concurrently select a network-configuration parameter 420 associated with the UEs 110 and a network-configuration parameter 420 associated with the base stations 120. In this manner, the network-optimization controller 170 evaluates gradients 440 determined by both the UEs 110 and the base stations 120 together and the resulting optimized network-configuration parameters 460 for the UEs 110 and the base stations 120 further optimize performance of these entities as a group instead of individually.

Example Method

Figure 7:
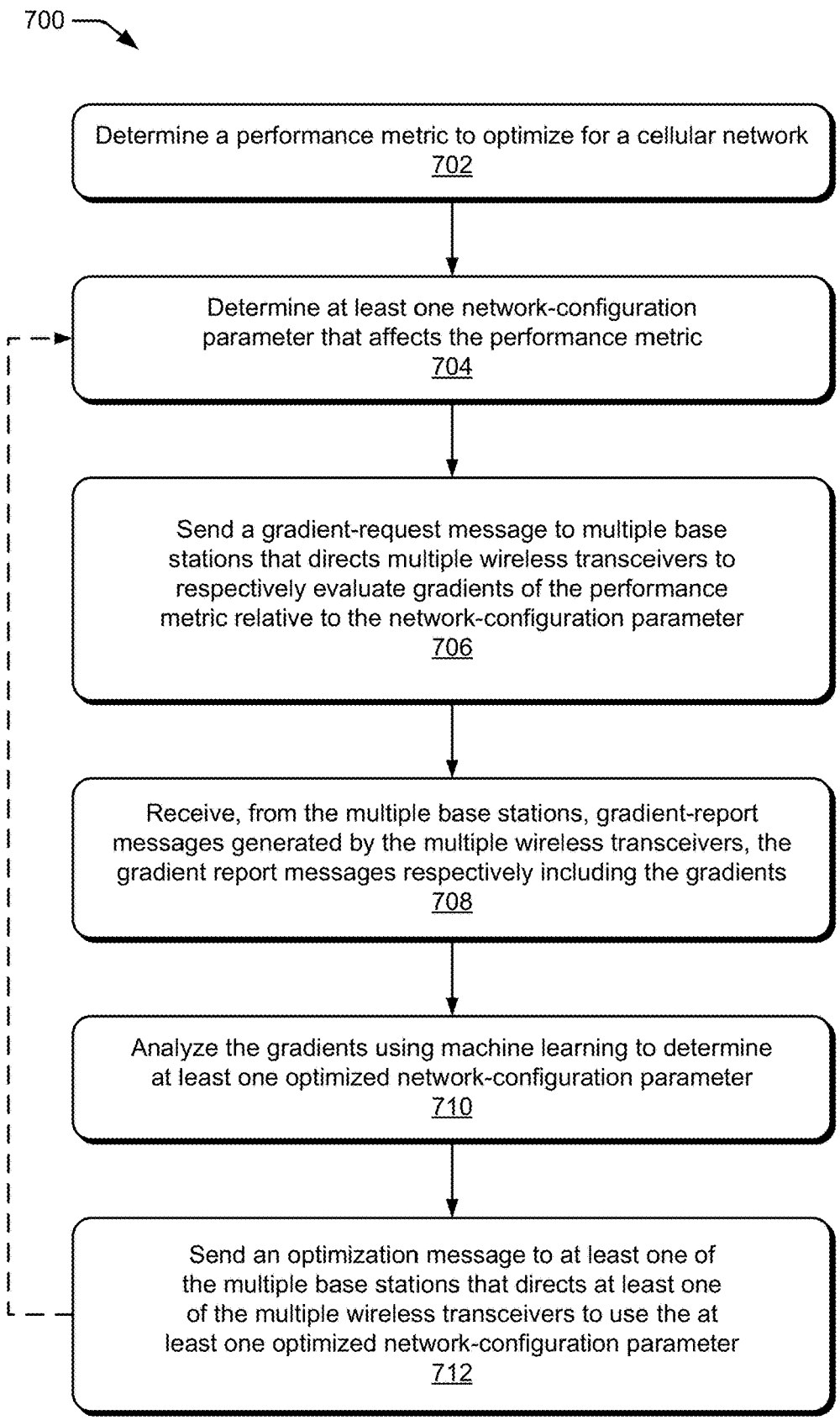
FIG. 7 illustrates an example method of a network-optimization controller for optimizing a cellular network using machine learning.

FIG. 7 illustrates an example method for optimizing a cellular network using machine learning. Method 700 is shown as a set of operations (or acts) performed but not necessarily limited to the order or combinations in which the operations are illustrated. Further, any of one or more of the operations may be repeated, combined, reorganized, skipped, or linked to provide a wide array of additional and/or alternate methods. In portions of the following discussion, reference may be made to environment 100 of FIG. 1, and entities detailed in FIGS. 2 and 3, reference to which is made for example only. The techniques are not limited to performance by one entity or multiple entities operating on one device.

At 702, the network-optimization controller determines a performance metric to optimize for a cellular network. For example, the network-optimization controller 170 determines the performance metric 410 to optimize for the cellular network (e.g., one or more RANs 140 of FIG. 1), as described above with respect to FIG. 4.

At 704, the network-optimization controller determines at least one network-configuration parameter that affects the performance metric. For example, the network-optimization controller 170 determines the network-configuration parameter 420 that affects the performance metric 410, as described above with respect to FIG. 4. The network-configuration parameter 420 can be associated with one or more UEs 110, one or more base stations 120, or a combination thereof.

At 706, the network-optimization controller sends a gradient-request message to multiple base stations that directs multiple wireless transceivers to respectively evaluate gradients of the performance metric relative to the network-configuration parameter. For example, the network-optimization controller 170 sends the gradient-request message 430 to the base stations 120, as shown in FIGS. 5 and 6.

The multiple wireless transceivers can include one or more of the base stations 120, one or more UEs 110 that are attached to the base stations 120, or a combination thereof. The gradient-request message 430 directs the UEs 110 and/or the base stations 120 to respectively evaluate the gradients 440 of the performance metric 410 relative to the network-configuration parameter 420, as described in FIGS. 5 and 6. If the multiple wireless transceivers include one or more UEs 110, the network-optimization controller directs the multiple base stations to pass the gradient-request message to the UEs 110, as shown in FIG. 5.

At 708, the network-optimization controller receives, from the multiple base stations, gradient-report messages generated by the multiple wireless transceivers. The gradient-report messages respectively include the gradients. For example, the network-optimization controller 170 receives, from the base stations 120, gradient-report messages 450 that are generated by the UEs 110 and/or the base stations 120, as shown in FIGS. 5 and 6. The gradient-report messages 450 respectively include the gradients 440.

At 710, the network-optimization controller analyzes the gradients using machine learning to determine at least one optimized network-configuration parameter. For example, the network-optimization controller 170 analyzes the gradients 440 using machine learning to determine at least one optimized network-configuration parameter 460, as described above with respect to FIG. 4. The at least one optimized network-configuration parameter 460 can include a single optimized network-configuration parameter 460 associated with a group of wireless transceivers or multiple optimized network-configuration parameters 460 associated with individual wireless transceivers.

At 712, the network-optimization controller sends an optimization message to at least one of the multiple base stations that directs at least one of the multiple wireless transceivers to use the optimized network-configuration parameter. For example, the network-optimization controller 170 sends the optimization message 470 to at least one of the base stations 120, as shown in FIGS. 5 and 6. The optimization message 470 directs at least one of the UEs 110 and/or at least one of the base stations 120 to use the optimized network-configuration parameter 460, as shown in FIGS. 5 and 6. If the multiple wireless transceivers include one or more UEs 110, the network-optimization controller directs the multiple base stations to pass the optimization message 470 to the UEs 110, as described in FIG. 5.

After a period of time, the network-optimization controller can optionally repeat the method at 704 to further optimize the previously-selected performance metric based on gradients taken with respect to a second network-configuration parameter. Alternatively, the network-optimization controller can repeat the method at 702 to select a second performance metric. By continually evaluating gradients 440 over time, the network-optimization controller 170 can explore other local or global optima and continually optimize the cellular network for short-term or long-term environmental changes.

CONCLUSION

Although techniques for optimizing a cellular network using machine learning have been described in language specific to features and/or methods, it is to be understood that the subject of the appended claims is not necessarily limited to the specific features or methods described. Rather, the specific features and methods are disclosed as example implementations of optimizing a cellular network using machine learning.

In mobile telecommunication networks, machine learning systems use gradients to optimize communication. Therefore, methods and devices are required to efficiently evaluate these gradients. This issue is addressed by a method with the features of examples 1 and 11. With these methods, one or more UEs, one or more base stations, or combinations thereof individually evaluate a performance metric based on a network-configuration parameter. The UEs or the base stations send back gradients to the network such that the network can perform machine learning.

In the following some embodiments are disclosed in the form of examples.

Example 1: A method for a network-optimization controller, the method comprising the network-optimization controller:
  determining a performance metric to optimize for a cellular network;
  determining at least one network-configuration parameter that affects the performance metric;
  sending a gradient-request message to multiple base stations that directs multiple wireless transceivers to respectively evaluate gradients of the performance metric relative to the at least one network-configuration parameter;
  receiving, from the multiple base stations, gradient-report messages generated by the multiple wireless transceivers, the gradient-report messages respectively including the gradients;
  analyzing the gradients using machine learning to determine at least one optimized network-configuration parameter; and
  sending an optimization message to at least one of the multiple base stations that directs at least one of the multiple wireless transceivers to use the at least one optimized network-configuration parameter.

Example 2: The method of example 1, wherein:
  the multiple wireless transceivers comprise the multiple base stations.

Example 3: The method of example 2, wherein:
  the at least one network-configuration parameter comprises at least one of the following:
    a downlink transmit power configuration;
    an antenna array configuration;
    a phase-code interval;
    a time-multiplexed pilot pattern;
    a data tone power;
    a data-to-pilot power ratio;
    a downlink time-slot allocation percentage;
    a subframe configuration;
    a handover configuration; or
    a multi-user scheduling configuration.

Example 4: The method of example 2 or 3, wherein:
  the performance metric comprises at least one of the following:
    spectrum efficiency;
    network capacity;
    cell-edge capacity;
    packet latency;
    total network interference;
    signal-to-interference-plus-noise ratio;
    received signal strength indication;
    reference signal received power;
    reference signal received quality;
    bit-error rate;
    packet-error rate;
    jitter;
    transmit-power headroom; or
    transmit power.

Example 5: The method of example 1, wherein:
  the multiple wireless transceivers comprise multiple user equipments that are in communication with the multiple base stations;
  the sending of the gradient-request message to the multiple base stations directs the multiple base stations to pass the gradient-request message to the multiple user equipments; and
  the sending of the optimization message to the at least one of the multiple base stations directs the at least one of the multiple base stations to pass the optimization message to the at least one of the multiple user equipments.

Example 6: The method of example 5, wherein:
  the sending of the gradient-request message to the multiple base stations directs the multiple base stations to:
    individually forward the gradient-request message to the multiple user equipments;
    broadcast the gradient-request message to the multiple user equipments; or
    multicast the gradient-request message to the multiple user equipments.

Example 7: The method of examples 5 or 6, wherein:
  the at least one network-configuration parameter comprises at least one of the following:
    an uplink transmit power configuration;
    a time-multiplexed pilot pattern;
    a data tone power;
    an uplink time-slot allocation percentage;
    a subframe configuration;
    a multi-user scheduling configuration; or
    a random-access configuration.

Example 8: The method of at least one of the examples 5 to 7, wherein:
the performance metric comprises at least one of the following:
spectrum efficiency;
network capacity;
packet latency;
signal-to-interference-plus-noise ratio;
received signal strength indication;
reference signal received power;
reference signal received quality;
bit-error rate;
packet-error rate;
jitter;
transmit-power headroom; or
transmit power.

Example 9: The method of example 1, wherein:
the multiple wireless transceivers comprise at least one first base station of the multiple base stations and at least one user equipment that is attached to at least one second base station of the multiple base stations;
the sending of the gradient-request message to the multiple base stations directs the at least one second base station to pass the gradient-request message to the at least one user equipment; and
the sending of the optimization message to the at least one of the multiple base stations directs the at least one second base station to pass the optimization message to the at least one user equipment.

Example 10: The method of example 9, wherein:
the determining of the at least one network-configuration parameter comprises:
determining a first network-configuration parameter that affects the performance metric, the first network-configuration parameter associated with the at least one user equipment; and
determining a second network-configuration parameter that affects the performance metric, the second network-configuration parameter associated with the at least one first base station;
the sending of the gradient-request message comprises:
sending, to the at least one second base station, a first gradient-request message that directs the at least one second base station to pass the first gradient request message to the at least one user equipment and directs the at least one user equipment to evaluate a first gradient of the performance metric relative to the first network-configuration parameter and generate a first gradient-report message of the gradient-report messages; and
sending a second gradient-request message to the at least one first base station that directs the at least one first base station to evaluate a second gradient of the performance metric relative to the second network-configuration parameter and generate a second gradient-report message of the gradient-report messages;
the analyzing of the gradients comprises analyzing the first gradient and the second gradient together using machine learning to determine a first optimized network configuration parameter associated with the at least one user equipment and a second optimized network-configuration parameter associated with the at least one first base station; and
the sending of the optimization message comprises:
sending a first optimization message to the at least one second base station that directs the at least one second base station to pass the first optimization message to the at least one user equipment and directs the at least one user equipment to use the first optimized network-configuration parameter; and
sending a second optimization message to the at least one first base station that directs the at least one first base station to use the second optimized network-configuration parameter.

Example 11: The method of example 9 or 10, wherein:
the at least one first base station comprises the at least one second base station.

Example 12: The method of at least one of the preceding examples, wherein:
the at least one optimized network-configuration parameter comprises multiple optimized network-configuration parameters respectively associated with the multiple wireless transceivers.

Example 13: The method of at least one of the preceding examples, wherein:
the at least one network-configuration parameters specifies a delta change to current network-configuration parameters that are used by the multiple wireless transceivers prior to the sending of the gradient-request message.

Example 14: The method of at least one of the preceding examples, wherein:
the gradients comprise a first amount of change in the performance metric relative to a second amount of change in the at least one network-configuration parameter.

Example 15: The method of at least one of the preceding examples, wherein:
the analyzing of the gradients using machine learning comprises:
employing gradient descent to determine the at least one optimized network-configuration parameter that minimizes a cost function; or
employing gradient ascent to determine the at least one optimized network-configuration parameter that maximizes a utility function.

Example 16: The method of example 15, wherein:
the at least one optimized network-configuration parameter is associated with a local optima of the cost function or the utility function.

Example 17: The method of example 15 or 16, further comprising:
determining at least one second network-configuration parameter that differs from the at least one optimized network-configuration parameter;
sending a second gradient-request message to the multiple base stations that directs the multiple wireless transceivers to respectively evaluate second gradients of the performance metric relative to the at least one second network-configuration parameter;
receiving, from the multiple base stations, second gradient-report messages generated by the multiple wireless transceivers, the second gradient-report messages respectively including the second gradients;
analyzing the second gradients using machine learning to determine at least one second optimized network-configuration parameter; and
sending a second optimization message to the at least one of the multiple base stations that directs the at least one of the multiple wireless transceivers to use the at least one second optimized network-configuration parameter.

Example 18: The method of example 17, wherein:
the at least one second optimized network-configuration parameter is associated with a global optima of the cost function or the utility function.

Example 19: The method of at least one of the preceding examples, further comprising:
  storing network topology data of the cellular network; and
  determining the at least one optimized network-configuration parameter based on the network topology data.

Example 20: A network-optimization controller comprising: a processor and memory system configured to perform the method of any of examples 1-19.

What is claimed is:

1. A method for a network-optimization controller, of a core network, the method comprising the network-optimization controller: determining a performance metric to optimize for a cellular network;
  determining at least one network-configuration parameter that affects the performance metric;
  sending a gradient-request message to multiple base stations that directs multiple wireless transceivers to respectively evaluate gradients of the performance metric relative to the at least one network-configuration parameter, the at least one network-configuration parameter specifying respective operational configurations of the multiple wireless transceivers, the multiple wireless transceivers including a user equipment and at least one other use equipment or base station of the multiple base stations, the at least one user equipment in communication with at least one of the multiple base stations;
  receiving, from the multiple base stations, gradient-report messages generated by the multiple wireless transceivers, the gradient-report messages respectively including the gradients, the gradients specifying an amount of change in the performance metric relative to an amount of change in the at least one network-configuration parameter;
  determining multiple optimized network-configuration parameters by analyzing the gradients using machine learning, the multiple optimized network-configuration parameters associated with multiple local optima or global optima of a function associated with the performance metric; and
  sending an optimization message to at least one of the multiple base stations that directs at least one of the multiple wireless transceivers to use multiple optimized network configuration parameters.

2. The method of claim 1, wherein:
the at least one network-configuration parameters comprises at least one of the following:
  an uplink transmit power configuration;
  a downlink transmit power configuration;
  an antenna array configuration;
  a phase-code interval;
  a time-multiplexed pilot pattern;
  a data tone power;
  a data-to-pilot power ratio;
  an uplink time-slot allocation percentage
  a downlink time-slot allocation percentage;
  a subframe configuration;
  a handover configuration; or
  a multi-user scheduling configuration; or
  a random-access configuration.

3. The method of claim 1, wherein:
the performance metric comprises at least one of the following:
  spectrum efficiency;
  network capacity;
  cell-edge capacity;
  packet latency;
  total network interference;
  signal-to-interference-plus-noise ratio;
  received signal strength indication;
  reference signal received power;
  reference signal received quality;
  bit-error rate;
  packet-error rate;
  jitter;
  transmit-power headroom; or
  transmit power.

4. The method of claim 1, wherein:
the multiple wireless transceivers include the user equipment and a second user equipment; and
the sending of the gradient-request message to the multiple base stations directs the multiple base stations to:
  individually forward the gradient-request message to the user equipment and the second user equipment;
  broadcast the gradient-request message to the user equipment and the second user equipment; or
  multicast the gradient-request message to the user equipment and the second user equipment.

5. The method of claim 1, wherein:
the multiple base stations comprise a first base station and a second base station;
the multiple wireless transceivers comprise the user equipment and the first base station;
the user equipment is attached to the second base station;
the sending of the gradient-request message to the multiple base stations directs the second base station to pass the gradient-request message to the user equipment; and
the sending of the optimization message to the at least one of the multiple base stations directs the second base station to pass the optimization message to the user equipment.

6. The method of claim 5, wherein:
the determining of the at least one network-configuration parameter comprises:
  determining a first network-configuration parameter that affects the performance metric, the first network-configuration parameter associated with the user equipment; and
  determining a second network-configuration parameter that affects the performance metric, the second network-configuration parameter associated with the first base station;
the sending of the gradient-request message comprises:
  sending, to the second base station, a first gradient-request message that directs the second base station to pass the first gradient-request message to the user equipment and directs the user equipment to evaluate a first gradient of the performance metric relative to the first network-configuration parameter and generate a first gradient-report message of the gradient-report messages; and
  sending a second gradient-request message to the first base station that directs the first base station to evaluate a second gradient of the performance metric relative to the second network-configuration parameter and generate a second gradient-report message of the gradient-report messages;
the analyzing of the gradients comprises analyzing the first gradient and the second gradient together using machine learning to determine a first optimized network-configuration parameter associated with the user equipment and a second optimized network-configuration parameter associated with the first base station; and the sending of the optimization message comprises:
- sending a first optimization message to the second base station that directs the second base station to pass the first optimization message to the user equipment and directs the user equipment to use the first optimized network-configuration parameter; and
- sending a second optimization message to the first base station that directs the first base station to use the second optimized network-configuration parameter.

7. The method of claim 6, wherein:
the first base station comprises the second base station.

8. The method of claim 1, wherein:
the multiple optimized network-configuration parameters comprises multiple optimized network-configuration parameters respectively associated with the multiple wireless transceivers.

9. The method of claim 1, wherein:
the at least one network-configuration parameter specifies a delta change to current network-configuration parameters that are used by the multiple wireless transceivers prior to the sending of the gradient-request message.

10. The method of claim 1, wherein:
the determining of the at least one optimize network configuration parameters comprises:
- employing gradient descent to determine the multiple optimized network-configuration parameters that minimizes a cost function; or
- employing gradient ascent to determine the multiple optimized network-configuration parameters that maximizes a utility function.

11. The method of claim 10, wherein:
the multiple optimized network-configuration parameters is associated with a local optima of the cost function or the utility function.

12. The method of claim 10, further comprising:
determining at least one second network-configuration parameter that differs from the multiple optimized network-configuration parameters;
sending a second gradient-request message to the multiple base stations that directs the multiple wireless transceivers to respectively evaluate second gradients of the performance metric relative to the at least one second network-configuration parameter;
receiving, from the multiple base stations, second gradient-report messages generated by the multiple wireless transceivers, the second gradient-report messages respectively including the second gradients;
determining at least one second optimized network-configuration parameter by
analyzing the second gradients using machine learning; and
sending a second optimization message to the at least one of the multiple base stations that directs the at least one of the multiple wireless transceivers to use the at least one second optimized network-configuration parameter.

13. The method of claim 12, wherein:
the at least one second optimized network-configuration parameter is associated with a global optima of the cost function or the utility function.

14. The method of claim 1, further comprising:
storing network topology data of the cellular network; and
determining the multiple optimized network-configuration parameters based on the network topology data.

15. A network-optimization controller comprising:
a processor and memory system configured to:
- determine a performance metric to optimize for a cellular network;
- determine at least one network-configuration parameter that affects the performance metric;
- send a gradient-request message to multiple base stations that directs multiple wireless transceivers to respectively evaluate gradients of the performance metric relative to the at least one network-configuration parameter, the at least one network-configuration parameter specifying respective operational configurations of the multiple wireless transceivers, the multiple wireless transceivers including a user equipment and at least one other user equipment or base station of the multiple base stations, the at least one user equipment in communication with at least one of the multiple base stations;
- receive, from the multiple base stations, gradient-report messages generated by the multiple wireless transceivers, the gradient-report messages respectively including the gradients, the gradients specifying an amount of change in the performance metric relative to an amount of change in the at least one network-configuration parameter;
- determine multiple optimized network-configuration parameters by analyzing the gradients using machine learning, the multiple optimized network-configuration parameters associated with multiple local optima or global optima of a function associated with the performance metric; and
- send an optimization message to at least one of the multiple base stations that directs the at least one of the multiple wireless transceivers to use the multiple optimized network-configuration parameters.

16. The network-optimization controller of claim 15, wherein:
the multiple base stations comprise a first base station and a second base station;
the multiple wireless transceivers comprise the user equipment and the first base station;
the user equipment is attached to the second base station; and
the processor and memory system are configured to:
- direct, using the gradient-request message, the second base station to pass the gradient-request message to the user equipment; and
- direct, using the optimization message, the second base station to pass the optimization message to the user equipment.

17. The network-optimization controller of claim 16, wherein:
the first base station comprises the second base station.

18. The network-optimization controller of claim 15, wherein:
the multiple optimized network-configuration parameters comprises multiple optimized network-configuration parameters respectively associated with the multiple wireless transceivers.

19. The network-optimization controller of claim 15, wherein:
the processor and memory system are configured to:
- employ gradient descent to determine the multiple optimized network-configuration parameters that minimizes a cost function; or employ gradient ascent to determine the multiple optimized network-configuration parameters that maximizes a utility function.

20. The network-optimization controller of claim 15, wherein:
the processor and memory system are configured to:
store network topology data of the cellular network; and
determine the multiple optimized network-configuration parameters based on the network topology data.

* * * * *